United States Patent [19]
Lema

[11] Patent Number: 5,203,891
[45] Date of Patent: Apr. 20, 1993

[54] GAS/LIQUID SEPARATOR

[75] Inventor: Luis E. Lema, North Attleboro, Mass.

[73] Assignee: The United States of America as represented by the Secretary of the Navy, Washington, D.C.

[21] Appl. No.: 862,709

[22] Filed: Apr. 3, 1992

[51] Int. Cl.⁵ .......................... B01D 45/16; B04C 5/13
[52] U.S. Cl. ........................................ 55/205; 55/460
[58] Field of Search ................ 55/52, 204, 205, 459.1, 55/460

[56]   References Cited
U.S. PATENT DOCUMENTS

| | | | |
|---|---|---|---|
| 2,616,563 | 11/1952 | Hebb | 55/459.1 X |
| 2,790,554 | 4/1957 | Work | 55/459.1 X |
| 3,014,553 | 12/1961 | Jerman et al. | 55/205 |
| 3,045,828 | 7/1962 | Hume | 55/459.1 X |
| 3,359,708 | 12/1967 | Barber | 55/205 X |
| 3,443,364 | 5/1969 | Saltsman | 55/459.1 X |
| 3,618,303 | 11/1971 | Nagel | 55/460 X |
| 3,720,314 | 3/1973 | Phillippi | 55/459.1 X |
| 3,771,288 | 11/1973 | Wisman et al. | 55/204 |
| 3,877,904 | 4/1975 | Lowrie | 55/204 X |
| 3,972,698 | 8/1976 | Klein et al. | 55/460 X |
| 4,005,998 | 2/1977 | Gorman | 55/459.1 X |
| 4,363,641 | 12/1982 | Finn, III | 55/205 |
| 4,483,696 | 11/1984 | Zipay et al. | 55/204 X |
| 4,975,192 | 12/1990 | Uda et al. | 55/205 X |
| 5,085,677 | 2/1992 | Ville et al. | 55/205 |

FOREIGN PATENT DOCUMENTS 2007118  5/1979  United Kingdom .............. 55/459.1

Primary Examiner—Robert Spitzer
Attorney, Agent, or Firm—Michael J. McGowan; Prithvi C. Lall; Michael F. Oglo

[57]   ABSTRACT

A gas/liquid separator which includes a hollow cylindrical separator body having: 1) an inlet port for receiving a tangential inflow of a gas/liquid mixture, and 2) an outlet port for allowing liquid separated from the mixture to tangentially exit the cylindrical separator body. The inlet port and outlet port are located such that they face 90° apart from one another. A hollow cylindrical vortex finder is positioned concentrically within the cylindrical separator body which allows the primary and secondary gas flows to exit as stipulated.

20 Claims, 2 Drawing Sheets

GAS/LIQUID SEPARATOR

STATEMENT OF GOVERNMENT INTEREST

The invention described herein may be manufactured and used by or for the Government of the United States of America for Governmental purposes without the payment of any royalties thereon or therefor.

This patent application is copending with my related patent application entitled "Combined Centrifugal Force/Gravity Gas/Liquid Separator" filed on the same date as subject patent application.

BACKGROUND OF THE INVENTION

1. Field of the Invention

The present invention relates generally to gas/liquid separators, and more particularly to gas/liquid separators that use centrifugal force to separate the gas from the liquid.

2. Description of the Prior Art

A gas/liquid separator (also called a hydrocyclone) facilitates the separation of gases from gas/liquid mixtures. One type of gas/liquid separator is known as a centrifugal separator. Typically, the gas/liquid mixture is introduced into a conical housing where the mixture is forced to spin therein. As the mixture is spun, the heavier liquid moves due to centrifugal force, to the walls of the housing while the gas, being lighter, migrates inward. In the case of conical housings, efficiency of separation is usually only about 50% because some of the liquid remains entrained within the gas while separated liquid exits the apex of the cone via gravity. The residual gas/liquid mixture flows out through the center of the cone through a hollow outlet tube called the vortex finder. See, for example, Suh, et al, U.S. Pat. No. 4,617,031, issued Oct. 14, 1986. Attempts at improving separation efficiency while increasing flow volume include increasing the size of the separating vessel or using a multiplicity of small volume separators in tandem. However, either of these options results in greater equipment costs and space requirements.

SUMMARY OF THE INVENTION

Accordingly, it is an object of the present invention to provide a gas/liquid separator that achieves high efficiency gas separation while minimizing cost and space requirements.

It is another object of the present invention to provide a high efficiency gas/liquid separator that is capable of handling high volume flow rates.

Other objects and advantages of the present invention will become more obvious hereinafter in the specification and drawings.

In accordance with the present invention, a gas/liquid separator is provided. The separator includes a hollow cylindrical separator body having: 1) an inlet port in a top sidewall thereof for receiving a tangential inflow of a gas/liquid mixture, and 2) an outlet port in a bottom sidewall thereof for allowing liquid separated from the mixture to tangentially exit the cylindrical separator body. The inlet port and outlet port are located 90° apart. A hollow cylindrical vortex finder is positioned concentrically within the cylindrical separator body. The vortex finder has: 1) first gas entrance ports aligned with the inlet port of the separator body for receiving a primary gas flow separated from the mixture, and 2) second gas entrance ports aligned with the outlet port of the separator body for receiving a secondary gas flow separated from the mixture. The cylindrical vortex finder is further provided with means to allow the primary and secondary gas flows to exit same.

BRIEF DESCRIPTION OF THE DRAWING(s)

DESCRIPTION OF THE PREFERRED EMBODIMENT(s)

Figure 1:
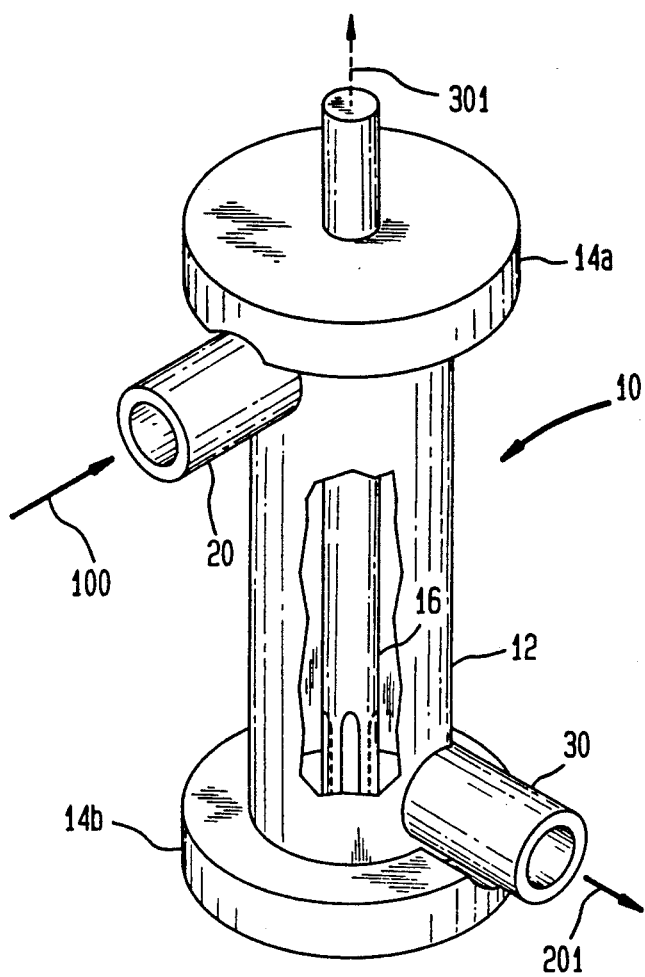
FIG. 1 is a perspective view of the gas/liquid separator according to the teachings of the present invention.

Referring now to the drawings, and in particular to FIG. 1, a perspective view of the gas/liquid separator is shown and is referenced generally by the numeral 10. Separator 10 includes a hollow, cylindrical separator body 12 capped at either end by end caps 14a and 14b which may be used to mount separator 10 in a gas/liquid flow system (not shown). The perspective view of FIG. 1 is further cut away at a central portion thereof to reveal a hollow, cylindrical vortex finder 16 passing concentrically through separator body 12.

Figure 2:
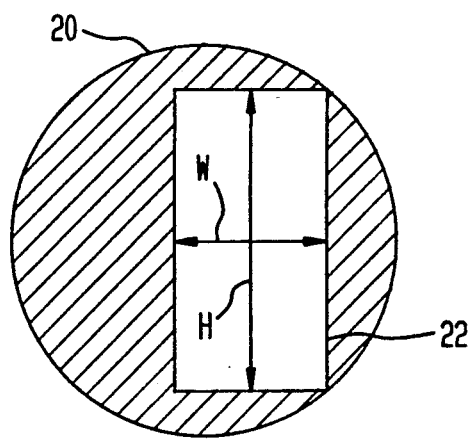
FIG. 2 is a cross-sectional view at the point where the inlet flow line connects to the separator body to reveal a rectangular inlet port.

At the top of separator body 12, an inlet flow line 20 is connected thereto in a tangential fashion. Inlet flow line 20 introduces a tangential flow of a gas/liquid mixture into separator body 12. The gas/liquid mixture is indicated by flow arrow 100. At the point where inlet flow line 20 connects to separator body 12, as shown in the cross-sectional view of FIG. 2, a rectangular inlet port 22 is provided in the side wall of separator body 12 having a height H and a width W. Rectangular inlet port 22 serves to squeeze the incoming flow 100 into a rectangle in order to make same a tangential flow within separator body 12. For good tangential flow, the height-to-width ratio, or H:W, for port 22 is preferably at least 2:1.

At the bottom of separator body 12, an outlet flow line 30 is provided. Outlet flow line 30 allows liquid separated from the gas/liquid mixture of flow 100, as indicated by flow arrow 201, to exit separator body 12 in a tangential fashion. At the point where outlet flow line 30 connects to separator body 12, a rectangular outlet port (not shown) is provided in the side wall of separator body 12 to communicate with outlet flow line 30. The rectangular outlet port communicating with outlet flow line 30 is dimensioned to be identical with rectangular input port 22 and faces in a direction that is offset by 90° with respect to rectangular inlet port 22.

Gas separated from the gas/liquid mixture of flow 100 leaves separator body 12 via vortex finder 16. Shown in greater detail in the isolated side view of FIG. 3, vortex finder 16 is provided with a plurality of identically sized and shaped gas entrance ports 18 located around vortex finder 16 at both the upper 16a and lower 16b ends thereof. The ports 18 located at the lower end 16b of vortex finder 16 are symmetrical with the ports located at the upper end 16a. Symmetry is with respect to the center 16c of vortex finder 16. Accordingly, a description of ports 18 at the upper end 16a is sufficient to describe the ports 18 at the lower end 16b.

In particular, the ported area of gas entrance ports 18 at the upper end 16a of vortex finder 16 should be approximately equal to that of rectangular inlet port 22 of separator body 12. Furthermore, the length L of each port 18 is preferably equal to the height H of rectangular inlet port 22, and should also be aligned top-to-bottom in the same horizontal plane of rectangular inlet port 22.

Three ports 18 are provided in the upper end 16a of vortex finder 16 and are spaced (on center) 120° apart from one another. Each port 18 can be thought of as two vertically aligned slot portions 18a and 18b of respective slot widths $W_a$ and $W_b$ and respective longitudinal lengths $L_a$ and $L_b$. Slot portion 18a is dimensionally wider and longer than slot portion 18b.

Figure 3:
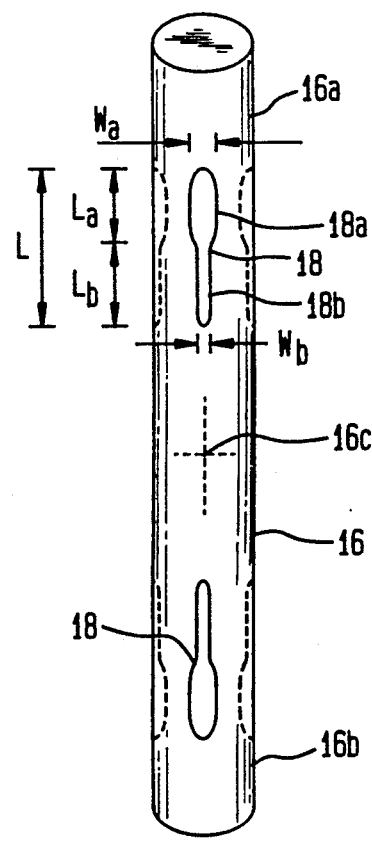
FIG. 3 is an isolated, side view of the hollow, cylindrical vortex finder provided concentrically within the separator body of the present invention.
Figure 4:
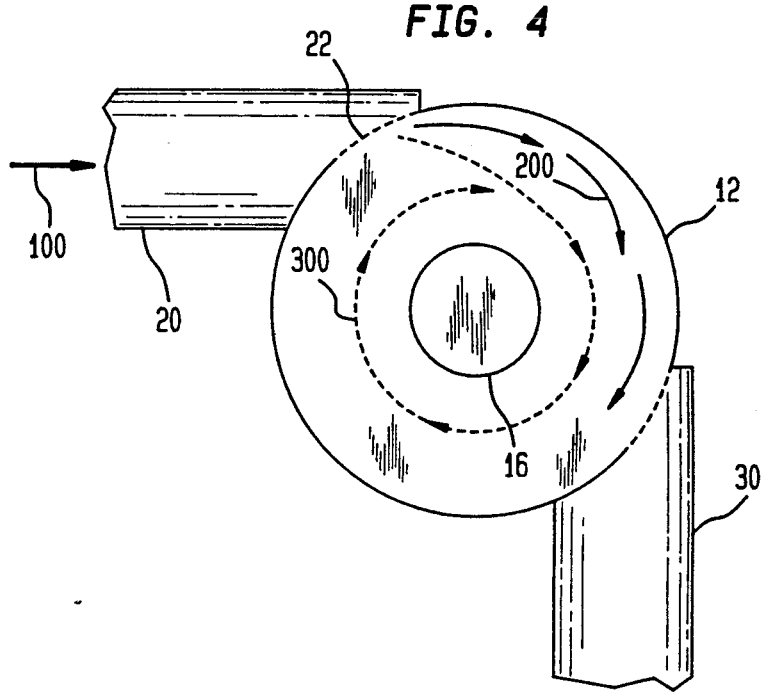
FIG. 4 is a top view of the separator body with its end cap removed for viewing separated gas and separated liquid flow therein.
Figure 5A:
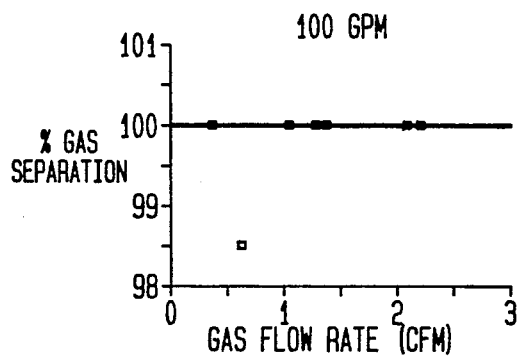
FIGS. 5(a)-5(d) are graphs showing the experimental separation efficiencies for four different flow rates passing through a gas/liquid separator designed according to the present invention.
Figure 5B:
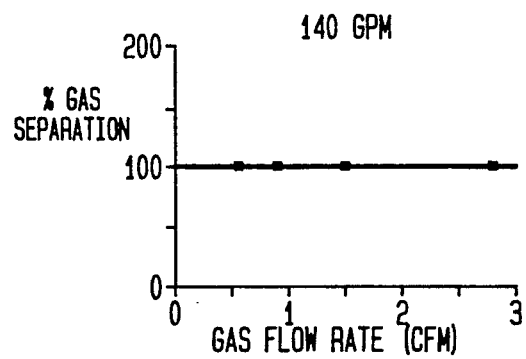
Figure 5C:
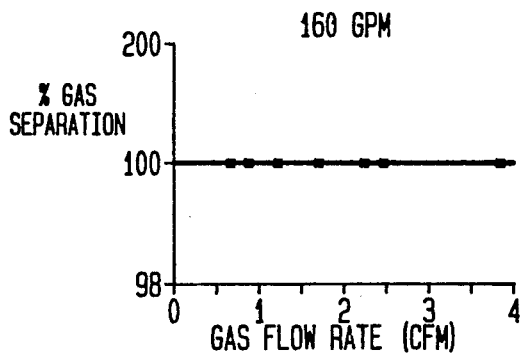
Figure 5D:
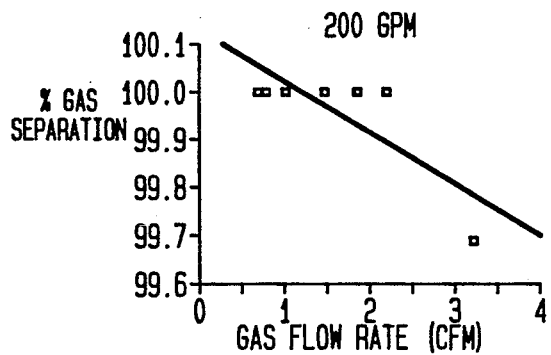

The operation of the present invention will now be described with reference to FIGS. 1-4. A gas/liquid mixture 100 is introduced tangentially into separator body 12 via rectangular inlet port 22. The resulting flow created in separator body 12 is shown in FIG. 4. FIG. 4 is a top view of separator body 12 with end cap 14a removed for purposes of description. As gas/liquid mixture flow 100 enters separator body 12, the heavier liquid separates from the mixture and moves to the outermost portion of separator body 12 as indicated by solid flow arrows 200. Simultaneously, the lighter gas separating from the liquid, spins around vortex finder 16 as shown by dashed flow arrows 300. A uniformly shaped cylinder of separated gas is thereby formed in separator body 12.

Since both rectangular inlet port 22 and the rectangular outlet port communicating with outlet line 30 are identically sized, the cylinder of separated gas 300 remains stable thereby improving separation efficiency. The separated gas 300 exits the separator body 12 via the gas entrance ports 18 located at the upper 16a and lower 16b ends of vortex finder 16. The separated gas exits vortex finder 16 via a gas exit port located in end cap 14a as indicated by flow arrow 301 in FIG. 1.

The stability of the cylinder of separated gas 300 within separator body 12 is also due to the horizontal alignment of the ports 18 with the respective rectangular ports in the sidewalls of separator body 12. Also, by making the area of the respective rectangular ports equal to the combined area of the correspondingly aligned ports 18 in vortex finder 16, the stability of the cylinder of separated gas 300 and therefore, separation efficiency, are further enhanced. Finally, the symmetry between the upper 16a and lower 16b ends of vortex finder 16 also contribute to the stability of the cylinder of separated gas 300.

Separation efficiency for the above described design is best shown by way of experiment. The dimensions used for the various ports of separator 10 as shown in FIG. 3 are as follows:

| | |
|---|---|
| Rectangular inlet/outlet ports: | H = 2.08", W = 0.59" |
| Slot portion 18a: | $L_a$ = 1.25", $W_a$ = 0.30" |
| Slot portion 18b: | $L_b$ = 0.83", $W_b$ = 0.062" |
| Inside diameter of separator body: | 6.5" |
| Inside diameter of vortex finder: | 0.5" |

A gas/liquid mixture consisting of helium/water (0.1 to 3 cubic feet per minute of gas and a flow rate of one of 100, 140, 160 or 200 gallons per minute of liquid) was submitted to the separator designed according to the above description and dimensions. Separation efficiency results are presented for the above mentioned flow rates respectively in FIGS. 5(a)-5(d). It is clear that the above design achieves approximately 100% separation efficiency regardless of the flow rates between 100-200 gallons per minute. Other flow rates/gas flow rates could easily be accommodated by adjusting the dimensions of the rectangular inlet/outlet ports and those of the vortex finder.

It will also be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A gas/liquid separator comprising:
    a hollow cylindrical separator body having: 1) an inlet port in a top sidewall thereof for receiving a tangential inflow of a gas/liquid mixture, and 2) an outlet port in a bottom sidewall thereof for allowing liquid separated from the mixture to tangentially exit said cylindrical separator body, wherein said inlet port and outlet port are located 90° apart; and
    a hollow cylindrical vortex finder positioned concentrically within said cylindrical separator body, said vortex finder having: 1) first gas entrance ports aligned with said inlet port of said separator body for receiving a primary gas flow separated from the mixture, and 2) second gas entrance ports aligned with said outlet port of said separator body for receiving a secondary gas flow separated from the mixture, wherein said cylindrical vortex finder is further provided with means to allow the primary and secondary gas flows to exit same.

2. A gas/liquid separator as in claim 1, wherein said inlet and outlet ports are identically dimensioned rectangles.

3. A gas/liquid separator as in claim 2 wherein a height-to-width ratio of said identically dimensioned rectangles is at least 2:1.

4. A gas/liquid separator as in claim 3, wherein cross-sectional area of said first gas entrance ports is approximately equal to that of said inlet port, and wherein cross-sectional area of said second gas entrance ports is approximately equal to that of said outlet port.

5. A gas/liquid separator as in claim 4, wherein said first and second gas entrance ports are identically dimensioned slot arrangements.

6. A gas/liquid separator as in claim 5, wherein each of said slot arrangements comprises three identically dimensioned slots positioned around said cylindrical vortex finder in a 120° relationship.

7. A gas/liquid separator as in claim 6, wherein each of said slots is vertically aligned in an axial direction of said cylindrical vortex finder, and further wherein the length of each of said slots is equal to the height of said identically dimensioned rectangles.

8. A gas/liquid separator as in claim 7, wherein each of said slots has first and second slot portions, said first slot portion being dimensionally longer and wider than said second slot portion.

9. A gas/liquid separator as in claim 8, wherein said first slot portion is above said second slot portion at said first gas entrance ports, and wherein said first slot portion is below said second slot portion at said second gas entrance ports, whereby said first and second gas entrance ports are symmetrical to one another with respect to the center of said vortex finder.

10. A gas/liquid separator as in claim 1, wherein cross-sectional area of said first gas entrance ports is approximately equal to that of said inlet port, and wherein cross-sectional area of said second gas entrance ports is approximately equal to that of said outlet port.

11. A gas/liquid separator as in claim 1, wherein said first and second gas entrance ports are identically dimensioned slot arrangements.

12. A gas/liquid separator as in claim 11, wherein each of said slot arrangements comprises three identically dimensioned slots positioned around said cylindrical vortex finder in a 120° relationship.

13. A gas/liquid separator as in claim 12, wherein each of said slots is vertically aligned in an axial direction of said cylindrical vortex finder.

14. A gas/liquid separator as in claim 13, wherein each of said slots has first and second slot portions, said first slot portion being dimensionally longer and wider than said second slot portion.

15. A gas/liquid separator as in claim 14, wherein said first slot portion is above said second slot portion at said first gas entrance ports, and wherein said first slot portion is below said second slot portion at said second gas entrance ports, whereby said first and second gas entrance ports are symmetrical to one another with respect to the center of said vortex finder.

16. A gas/liquid separator comprising:
a first hollow cylindrical body having identically dimensioned, rectangular inlet and outlet ports positioned to enter a sidewall of said first cylindrical body in a tangential fashion at opposite ends thereof, said inlet and outlet ports further facing 90° away from each other;
a second hollow cylindrical body located concentrically within said first cylindrical body and having a gas exit port, said second cylindrical body further being provided with perforations aligned with said inlet and outlet ports, whereby when a gas/liquid mixture enters said first cylindrical body through said inlet port, a vortex flow is created therein such that: 1) gas is separated from the mixture and enters said second cylindrical body via the perforations aligned with said inlet and outlet ports, and 2) liquid is separated from the mixture and exits said first cylindrical body via said outlet port; and
means for allowing the gas entering said second cylindrical body to exit same.

17. A gas/liquid separator as in claim 16, wherein said perforations aligned with said rectangular inlet port comprise a first plurality of slots vertically extended in an axial direction of said second cylindrical body, each of said first plurality of slots having a length corresponding to the height of said rectangular inlet port, and wherein said perforations aligned with said rectangular outlet port comprise a second plurality of slots vertically extended in an axial direction of said second cylindrical body, each of said second plurality of slots having a length corresponding to the height of said rectangular outlet port.

18. A gas/liquid separator as in claim 17, wherein cross-sectional areas of each of said rectangular inlet and outlet ports are approximately equal to cross-sectional areas of said first and second plurality of slots, respectively.

19. A gas/liquid separator as in claim 17, wherein each of said first and second plurality of slots comprises three identically dimensioned slots positioned around said second cylindrical body in a 120° spaced apart relationship.

20. A gas/liquid separator as in claim 16, wherein a height-to-width ratio of each of said identically dimensioned rectangular inlet and outlet ports is at least 2:1.

* * * * *